Oct. 29, 1940.    J. THIRY    2,219,967

SERVOMOTOR FOR AIRCRAFT

Filed Oct. 28, 1938

INVENTOR.
Johannes Thiry
BY Stephen Cerstvik
ATTORNEY.

Patented Oct. 29, 1940

2,219,967

UNITED STATES PATENT OFFICE 2,219,967

SERVOMOTOR FOR AIRCRAFT

Johannes Thiry, Berlin-Charlottenburg, Germany, assignor to Siemens Apparate und Maschinen Gesellschaft mit beschrankter Haftung, Berlin, Germany, a corporation of Germany Application October 28, 1938, Serial No. 237,556
In Germany November 12, 1937

3 Claims. (Cl. 121—38)

This invention relates to servomotors and more particularly to motors for governing the control surfaces of aircraft.

Where servomotors are provided for governing the control surfaces of aircraft, it is necessary that means be provided for governing said surfaces by hand in the event of the failure of the motor or the automatic apparatus controlling the motor. During this manual control, the servomotor must offer as little resistance as possible to movements of the mechanism by which the control surfaces are positioned. Consequently, for example in hydraulic servomotors, automatic means have been provided for short-circuiting the chambers on opposite extremities of a main cylinder of the motor. This has ordinarily been accomplished by operatively connecting said automatic means to a short-circuiting valve, or by automatically controlling the pressure of a fluid agent upon this valve. When a main servomotor control valve and the short-circuiting valve are both open, difficulty has been experienced previously in building up a sufficient pressure of said fluid medium to close the short-circuiting valve and to restore normal operation of the servomotor.

One of the objects of the present invention is to provide a novel hydraulic servomotor having a short-circuiting valve which may be quickly and positively opened and closed.

A further object is to provide a novel servomotor arrangement having means for rendering said motor ineffective.

The above and other objects and novel features of the invention will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claims.

Figure 1:
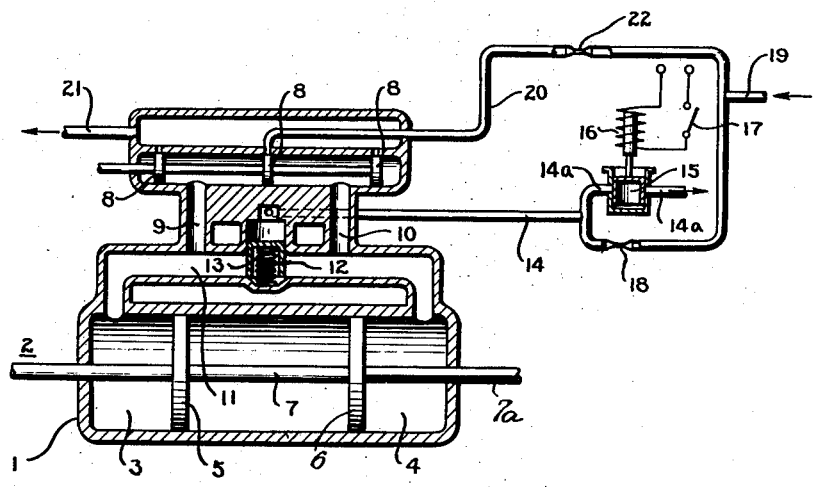
Fig. 1 is a side elevation, partly in section, of one embodiment of the invention.
Figure 2:
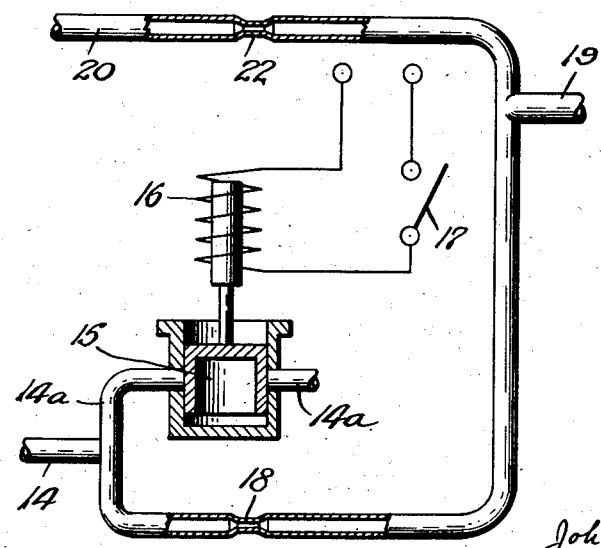
Fig. 2 is a fragmentary drawing showing the restricted portions on an enlarged scale.

In the form shown, the invention comprises a hydraulic servomotor having a conventional main control valve, main piston, and cylinder arrangement of the type disclosed in the issued patent to Eduard Fischel and Johannes Thiry, 2,179,179. A short-circuiting valve is provided which, when opened, places the chambers at opposite extremities of the main cylinder in communication with one another. A spring yieldingly urges the latter valve towards an open position, but the pressure of this spring is normally overcome and the valve held in a closed position by a pressure agent acting upon said valve. An additional valve is provided for by-passing the pressure agent acting upon the short-circuiting valve whereby the latter may be opened when desired. Since both the servomotor and the short-circuiting valve are actuated by a pressure agent from a common source, it may be impossible, when the main control valve is open, for sufficient pressure to build up to close the short-circuiting valve. This also may be true even when the by-pass valve is closed. Consequently a constriction is placed in the conduit leading to the main control valve which will assure a positive closing of the short-circuiting valve whenever desired.

In the form illustrated in the drawing, a main cylinder 1 of a servomotor 2 is provided with two pressure chambers 3 and 4 adjacent the outer faces of a pair of pistons 5 and 6 which are rigidly attached to a piston rod 7. The piston rod 7 may be provided with an elongation or tail rod 7a so that the volume accommodated by each of the pressure chambers 3 and 4 will be equal. Chambers 3 and 4 are in communication with a conventional control valve 8 by means of conduits 9 and 10, respectively. Said chambers furthermore are in communication with one another through a conduit 11 in which a second valve 12 is provided and is yieldingly thrust towards an open position by a spring 13. Valve 12 constitutes in effect a piston which may be moved by the pressure of an agent which is conducted through a conduit 14 to a suitable cylinder, in which the valve moves. In communication with conduit 14 through tube 14a is a valve 15 which is normally held in a closed position and which may be opened by means of a solenoid 16. The solenoid is connected through a switch 17 to a suitable source of energy (not shown). Conduit 14 is provided with a constricting portion 18 at a point between valve 15 and the junction of said conduit and a main conduit 19, the latter being in communication by a tube 20 with main control valve 8. A common servomotor exhaust tube 21 is provided adjacent valve 8. Both tubes 21 and conduit 14a empty into a pump (not shown) which forces the pressure agent into conduit 19. For a purpose to hereafter appear a constriction 22 is provided in tube 20.

In normal operation of the servomotor, the valve 15 is closed; consequently the short-circuiting valve 12 is also held closed against the pressure of spring 13, and pistons 5 and 6 are governed in a conventional manner. If, however, it is desired to control manually the mechanism which is ordinarily moved by the motor, the switch 17 is closed, solenoid 16 is energized, and valve 15 is opened. The opening of valve 15 will reduce the pressure of the agent which acts upon valve 12, spring 13 will open the valve, and chambers 3 and 4 will be short-circuited. Consequently, pistons 5 and 6 may move freely in cylinder 1. To restore control to the servomotor, switch 17 is opened, valve 15 is closed, and the pressure agent is directed upon valve 12. The action of constriction 22 upon the pressure medium causes said medium to build up sufficient pressure to close valve 12 regardless of the open or closed position of control valve 8.

There is thus provided a novel means for controlling a servomotor. The apparatus is positive and rapid in action and extremely simple in construction. Furthermore, the constrictions in the conduits enable a positive operation of the short-circuiting valve and cause sufficient pressure to be reserved, even while the main control valve is displaced from a central position, to actuate supplementary apparatus.

Although only one embodiment of the present invention has been illustrated and described in detail, it is to be expressly understood that the invention is not limited thereto. For example, valve 12, in the form shown, is located in conduit 11; however, it may instead be located in any conduit which is in communication with both chambers 3 and 4. Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. In apparatus of the class having a servomotor comprising a cylinder, a piston in said cylinder, a pressure inlet conduit, a control valve for said motor having a conduit communicating with the pressure inlet conduit, a conduit in communication with opposite extremities of said cylinder, a short-circuiting valve in said conduit, a conduit in communication with said short-circuiting valve and the pressure inlet conduit and control valve conduit, a by-pass valve in the last-named conduit, and constricting members in said control valve conduit and said short-circuiting valve conduit beyond the pressure inlet conduit and in advance of said by-pass valve and said control valve.

2. In apparatus of the class wherein a control valve governs the flow of a pressure agent to a servomotor having a cylinder, means yieldably urged to an open position for placing opposite extremities of said cylinder in communication, said means being actuated by said pressure agent to a closed position, an inlet conduit provided with means for conducting pressure agent to said control valve, a second conduit in communication with said inlet conduit and with said yieldably urged means, a by-pass valve in communication with the second conduit, and constricting portions in said pressure agent conducting means in advance of said control valve and in said second conduit in advance of said by-pass valve.

3. In apparatus of the class having a servomotor comprising a cylinder, a piston in said cylinder, a pressure inlet conduit, a control valve for said motor having a conduit in communication with said pressure inlet conduit, a conduit in communication with opposite extremities of said cylinder, a short-circuiting valve in said last-mentioned conduit, a conduit in communication with said short-circuiting valve and the pressure inlet conduit, a by-pass valve in communication with said last-named conduit, and a constricting portion for said control valve conduit beyond the pressure inlet conduit and in advance of said control valve.

JOHANNES THIRY.